United States Patent
Gvelesiani

(10) Patent No.: US 7,380,217 B2
(45) Date of Patent: May 27, 2008

(54) METHOD OF GRAPHICAL PRESENTATION OF RELATIONSHIPS BETWEEN INDIVIDUALS, BUSINESS ENTITIES, AND ORGANIZATIONS

(75) Inventor: Aleksandr L. Gvelesiani, Seattle, WA (US)

(73) Assignee: IntellecSpace Coropration, Seattle, WA (US)

( * ) Notice: Subject to any disclaimer, the term of this patent is extended or adjusted under 35 U.S.C. 154(b) by 550 days.

(21) Appl. No.: 10/861,269

(22) Filed: Jun. 4, 2004

(65) Prior Publication Data

US 2005/0004813 A1 Jan. 6, 2005

(51) Int. Cl.
- G06F 3/048 (2006.01)
- G06F 17/30 (2006.01)
- G06Q 10/00 (2006.01)
- G06Q 30/00 (2006.01)
- G07G 1/00 (2006.01)

(52) U.S. Cl. .......................... 715/804; 715/775; 705/1; 705/10

(58) Field of Classification Search ................ 715/804, 715/775; 705/1, 10, 804
See application file for complete search history.

(56) References Cited

U.S. PATENT DOCUMENTS

| | | | | |
|---|---|---|---|---|
| 5,414,809 A * | 5/1995 | Hogan et al. | ................ | 715/765 |
| 5,488,722 A * | 1/1996 | Potok | ............................ | 707/2 |
| 5,548,699 A * | 8/1996 | Ishida et al. | ................ | 345/440 |
| 5,638,539 A * | 6/1997 | Goti | ............................. | 707/1 |
| 5,819,270 A * | 10/1998 | Malone et al. | .................. | 707/7 |
| 6,035,300 A * | 3/2000 | Cason et al. | ................. | 707/102 |
| 6,237,006 B1 * | 5/2001 | Weinberg et al. | ........ | 707/103 R |
| 6,823,495 B1 * | 11/2004 | Vedula et al. | ............... | 715/805 |
| 7,167,910 B2 * | 1/2007 | Farnham et al. | ............. | 709/223 |
| 2002/0103805 A1 * | 8/2002 | Canner et al. | ............... | 707/100 |
| 2003/0065527 A1 * | 4/2003 | Yeh et al. | ........................ | 705/1 |
| 2003/0172049 A1 * | 9/2003 | Choy et al. | ..................... | 707/1 |
| 2004/0107125 A1 * | 6/2004 | Guheen et al. | ................. | 705/7 |

FOREIGN PATENT DOCUMENTS

WO  WO 01/33433 A1 * 5/2001

OTHER PUBLICATIONS

GenoPro☐☐Introduction secction☐☐Copyright 2000☐☐http://www.genopro.com/introduction/☐☐Printouts from archive.org Aug. 17, 2000.*

Alex Friedgan☐☐Graphical Patterns for Data Models☐☐http://www.tdan.com/i022ht01.htm☐☐Printouts from archive.org Nov. 4, 2002.*

(Continued)

Primary Examiner—William Bashore
Assistant Examiner—Andrea Long
(74) Attorney, Agent, or Firm—SeedIP Law Group PLLC

(57) ABSTRACT

A method of graphical presentation of relationships with business significance between business related entities such as individuals, business entities, and activities of human endeavor. Information retrieved from databases about relationships between business related entities can be more quickly and more clearly understood if the relationships are presented graphically with a symbol for each entity and links connecting the entities where each link specifies the type of relationship, such as employee, owner, shareholder, contractors, etc. When databases are queried about a particular entity, that entity is displayed in a prominent position, such as the center of the display.

19 Claims, 20 Drawing Sheets

Graphical Display with Symbols

OTHER PUBLICATIONS

Sarah E. Wentworth Data is Alpha and Omega http://www.tdan.com/i006fe10.htm Printouts from archive.org Feb. 10, 1999.*

Tom Finneran Enterprise Architecture: The What's and How's http://www.tdan.com/i018ht02.htm Printout from archive.org Oct. 6, 2001.*

Frank Leymann and Dieter Roller Business Process Management With FlowMark IEEE 1994 pp. 230-234.*

Richard Anderson, Jennifer Crakow and Jay Joichi Improving the Design of Business and Interactive System Concepts in the Digital Business Consultancy ACM Copyright 2002 pp. 213-223.*

Maria De Carvalho, J. Tan, J. Domingue, H. Petursson Linking Dynamic Query Interfaces to Knowledge Models IUI'02 Jan. 13-16, 2002 pp. 186-187.*

Stephen G. Eick Visualizing Online Activity Communications of the ACM Aug. 2001/vol. 44 No. 8 pp. 45-50.*

* cited by examiner

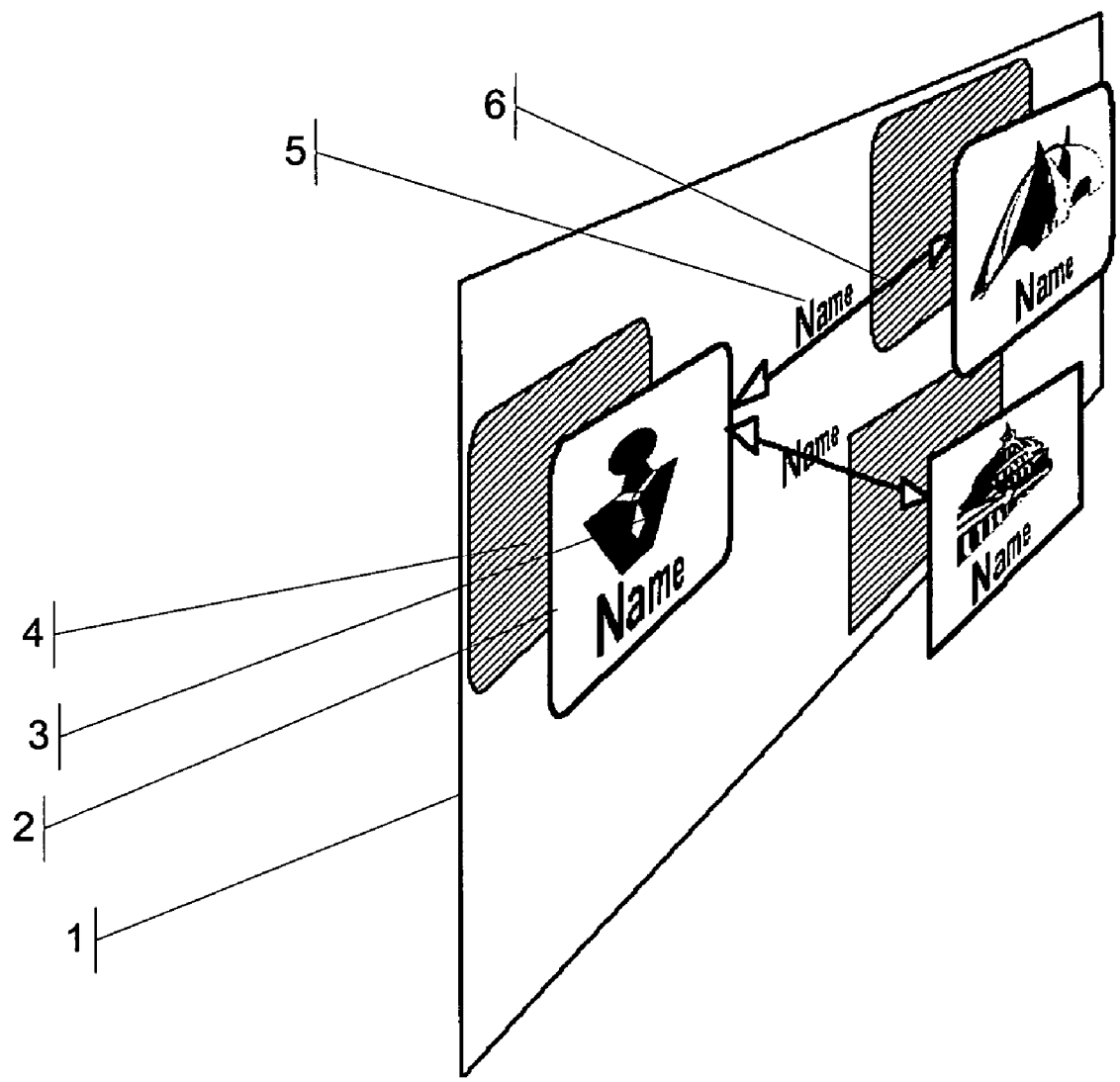
Figure 1.0

Graphical Display without Symbols
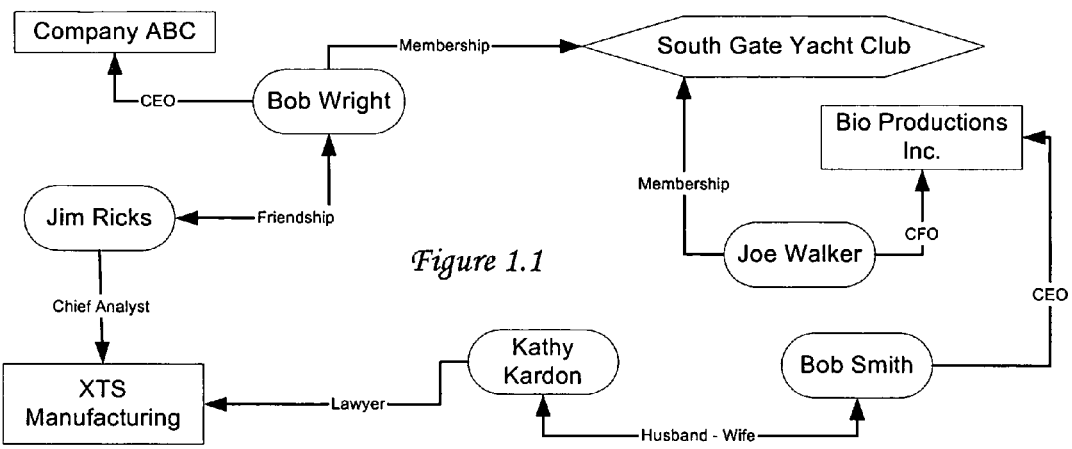
*Figure 1.1*
Graphical Display with Symbols
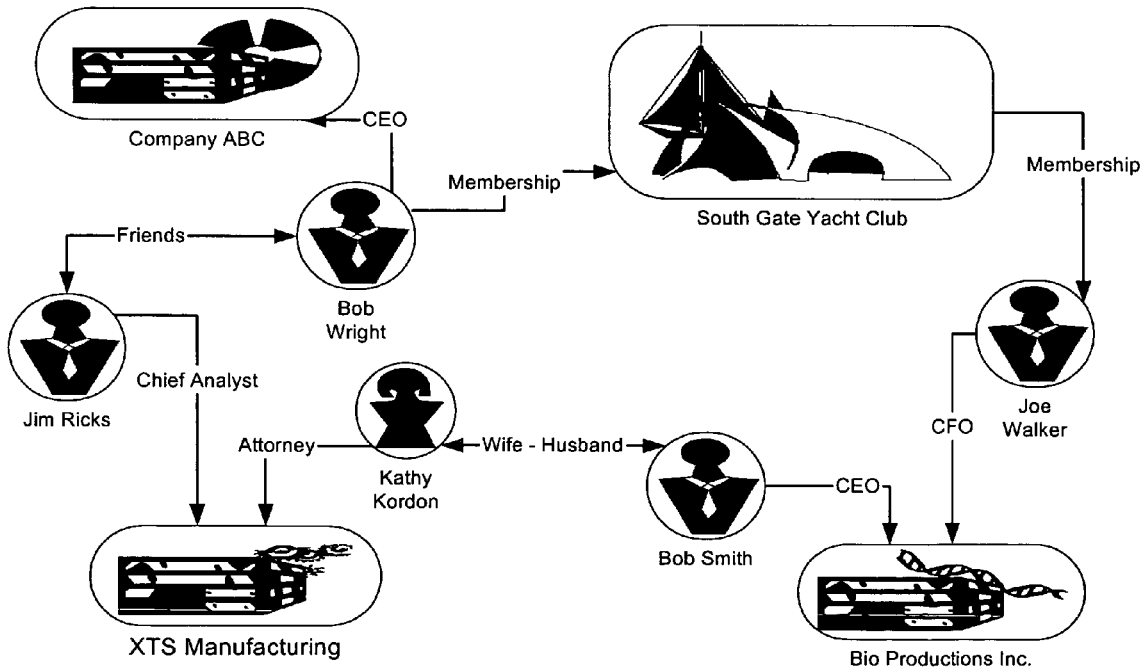
*Figure 1.2*

Company to Company Relationships
Figure 2.3
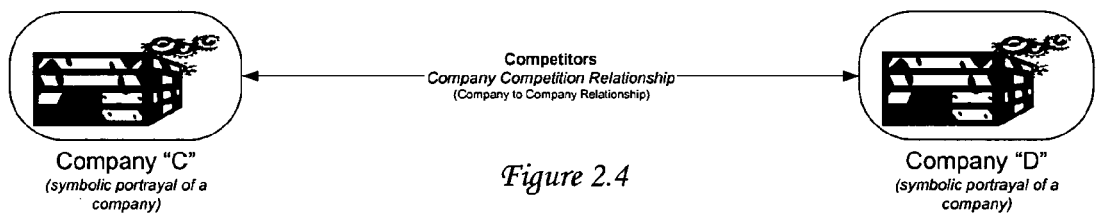
Figure 2.4
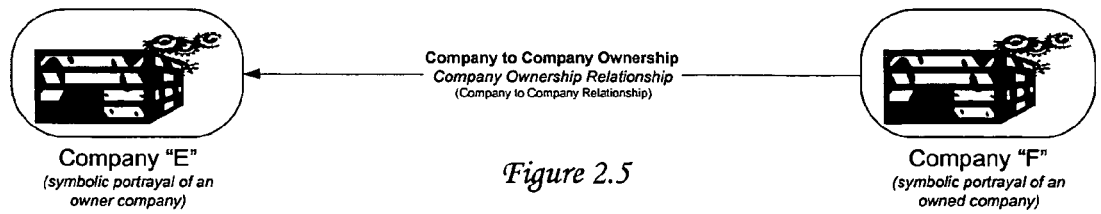
Figure 2.5

Company to Company Relationships
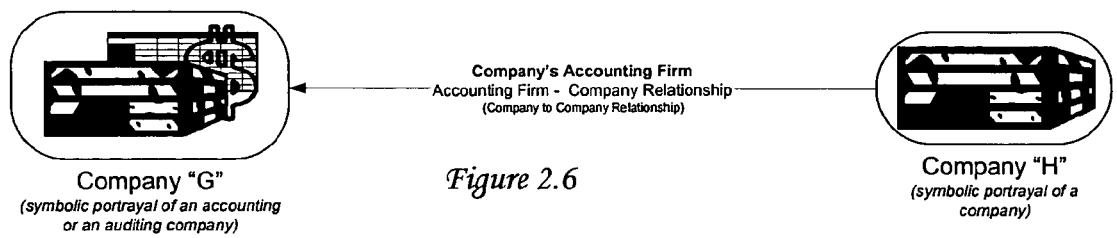
Figure 2.6
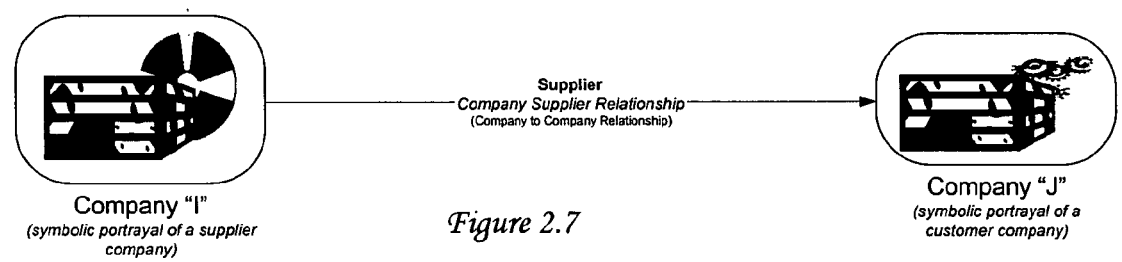
Figure 2.7
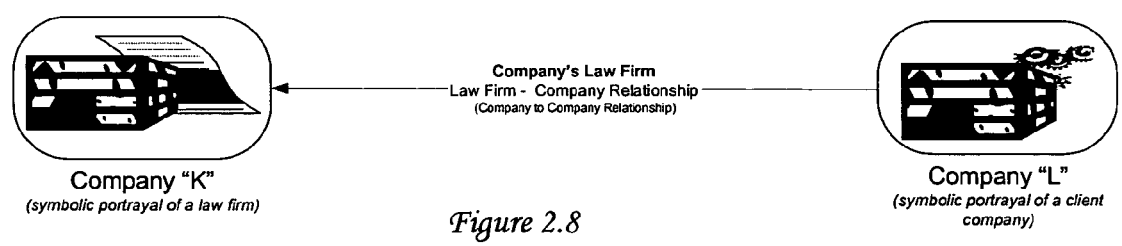
Figure 2.8

Company to Company Relationships
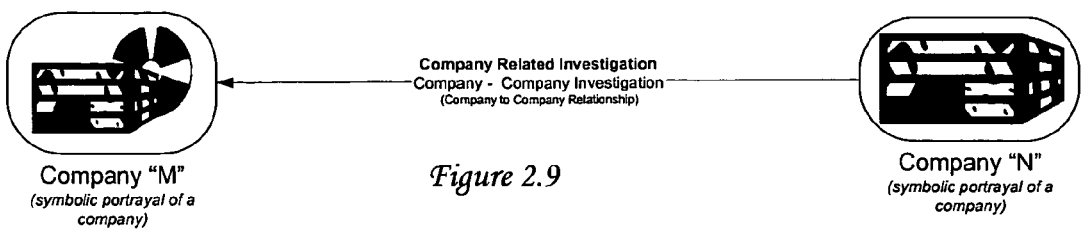
Figure 2.9
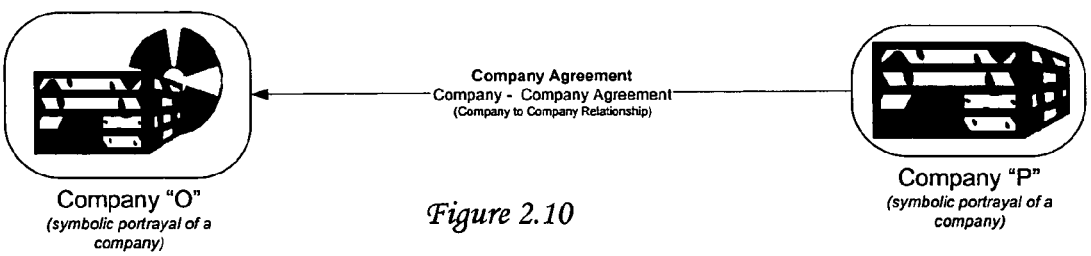
Figure 2.10
Figure 2.11

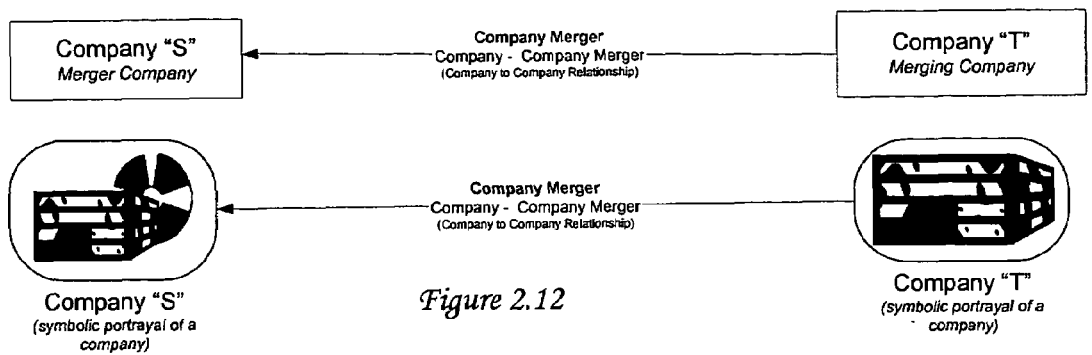
Figure 2.12

Person to Person Relationships
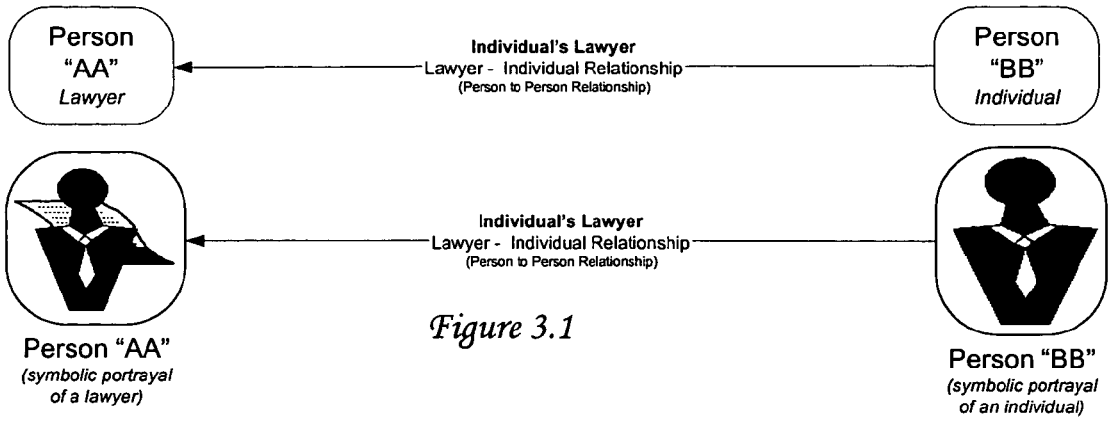
Figure 3.1
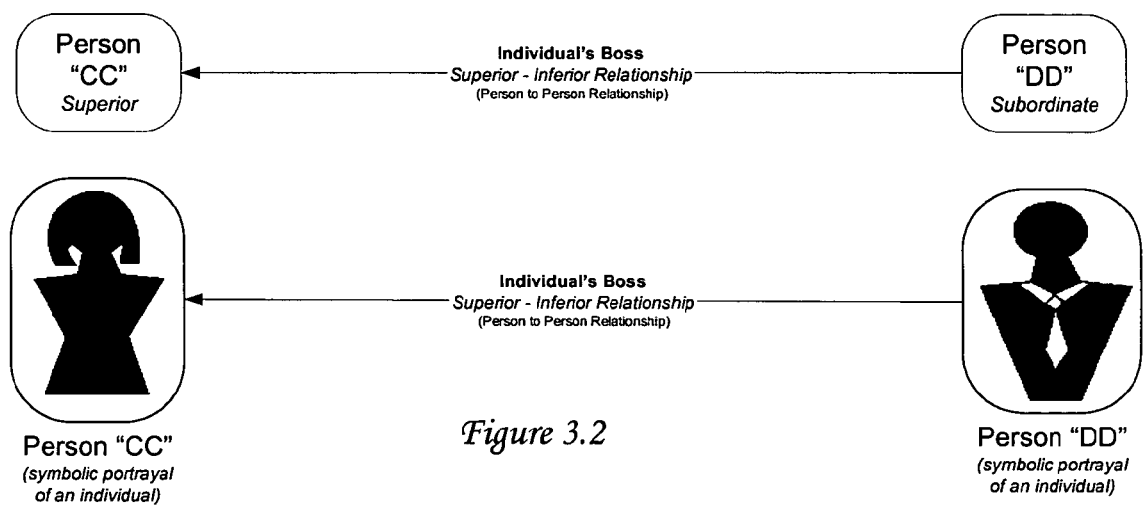
Figure 3.2
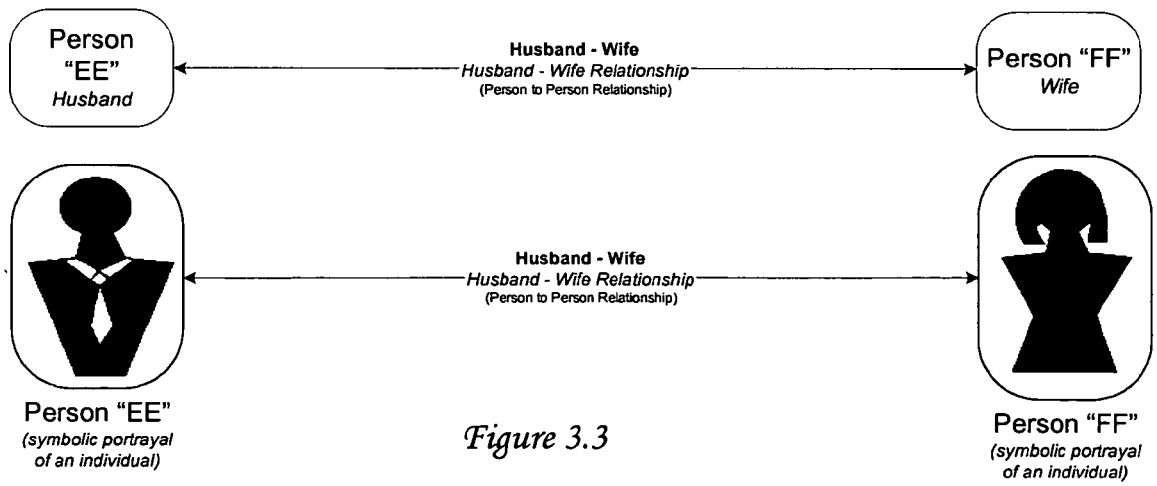
Figure 3.3

Person to Person Relationships
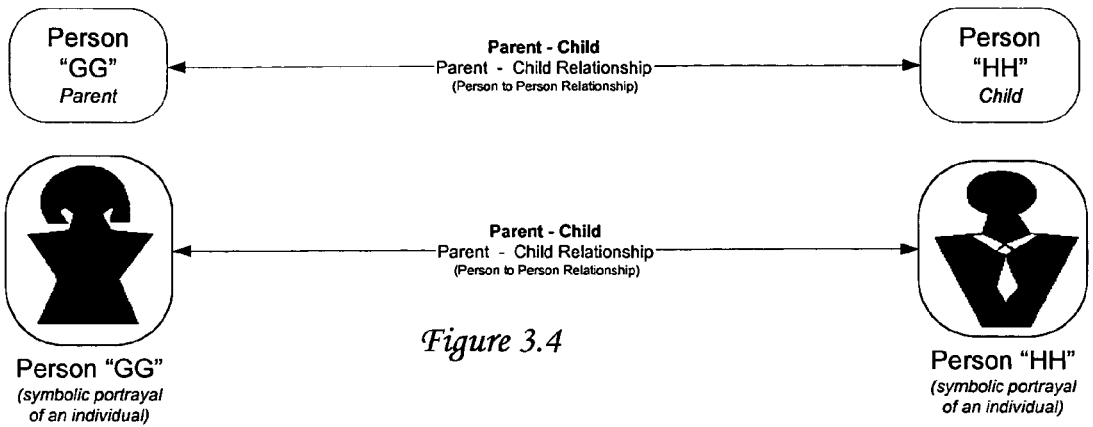
Figure 3.4
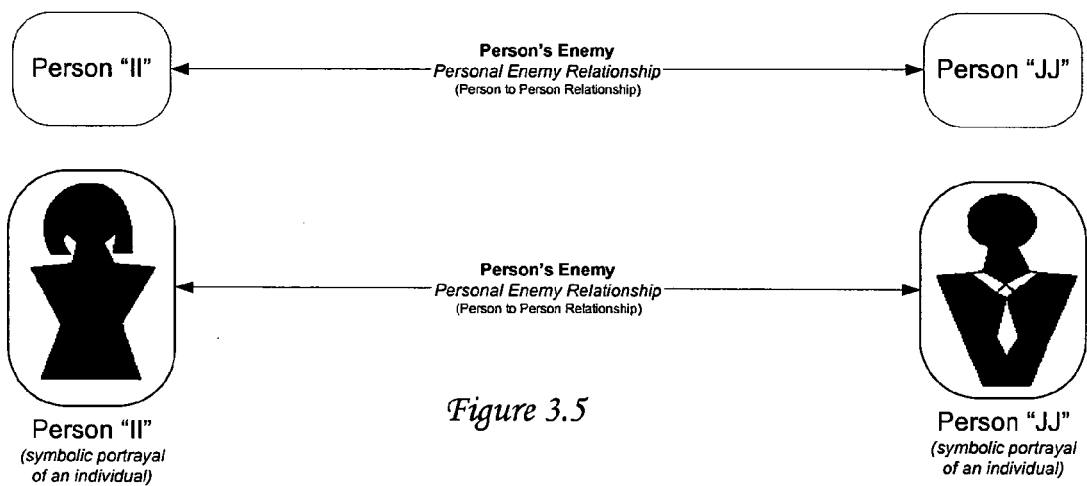
Figure 3.5
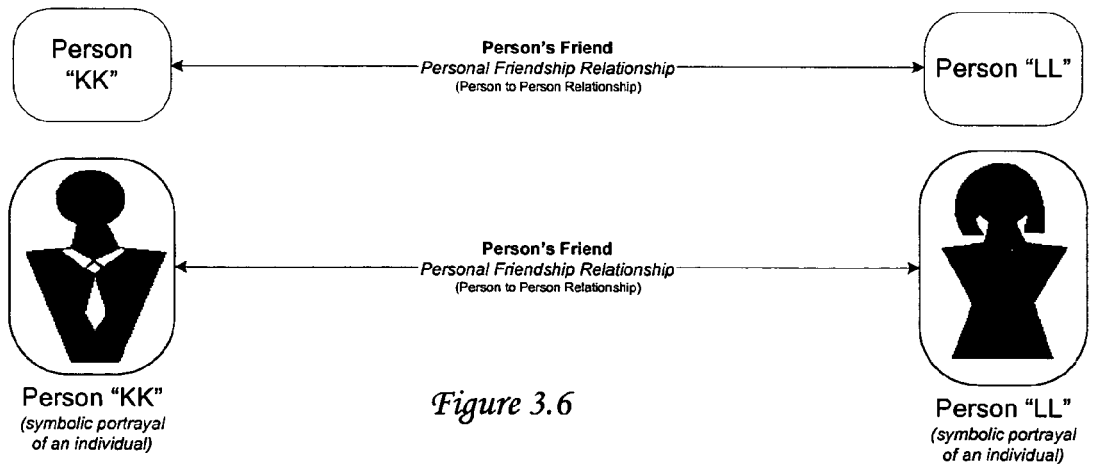
Figure 3.6

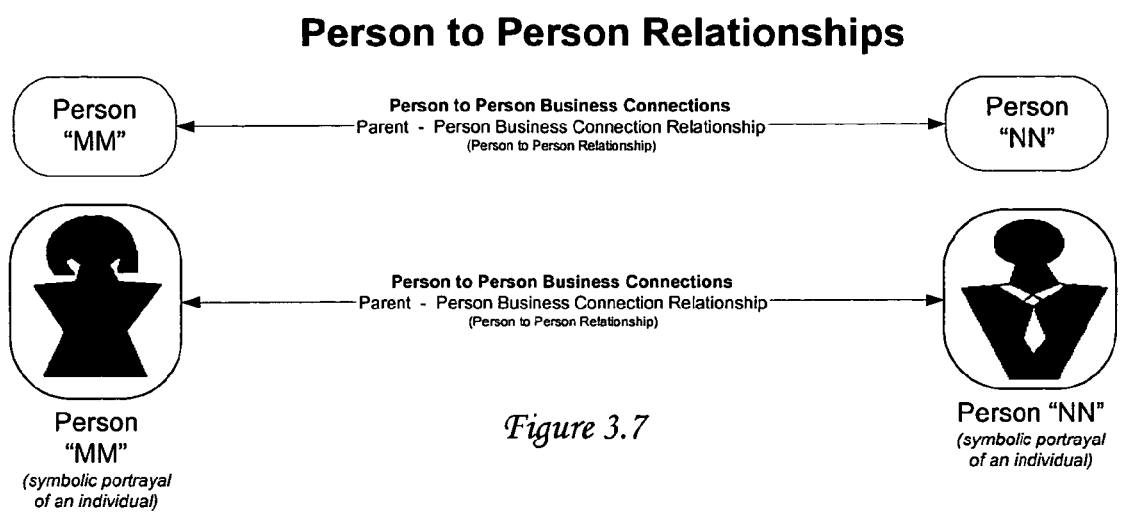
Figure 3.7

Person to Company Relationships
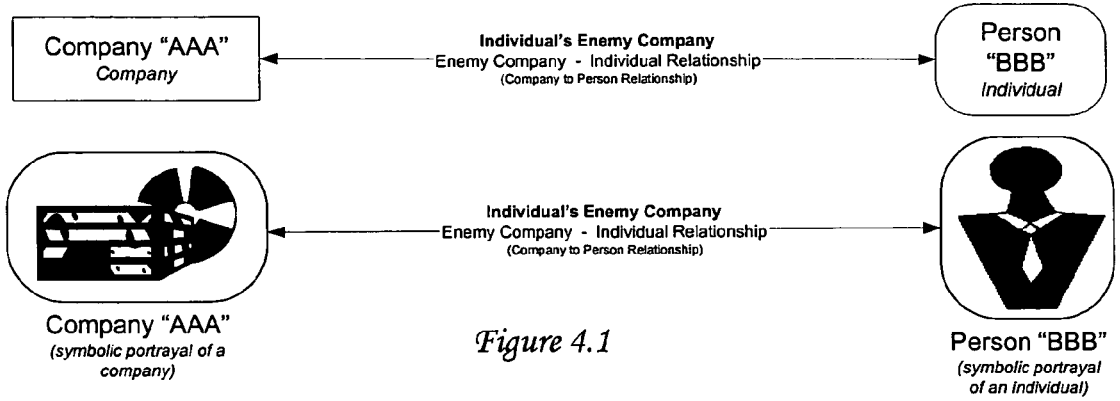
Figure 4.1
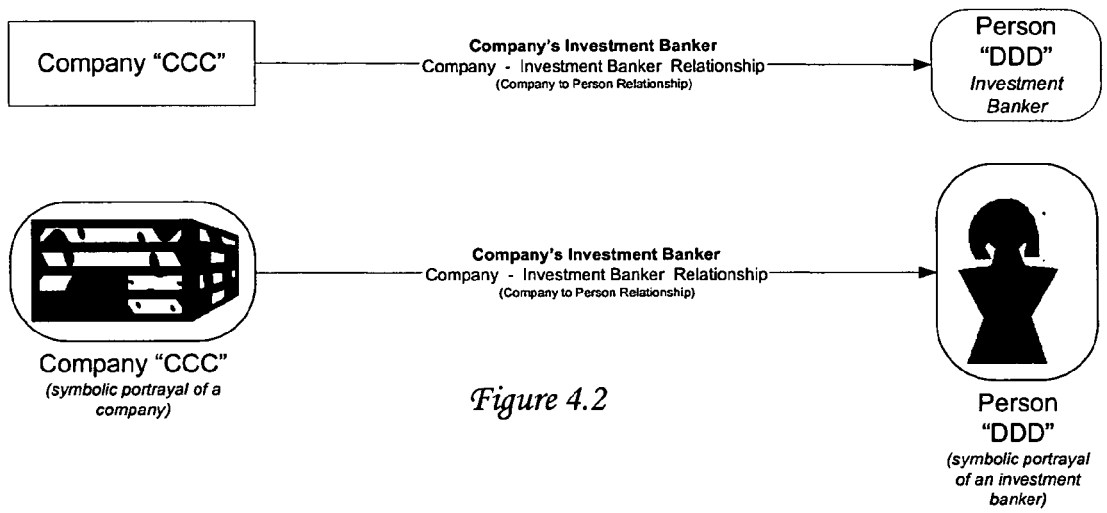
Figure 4.2
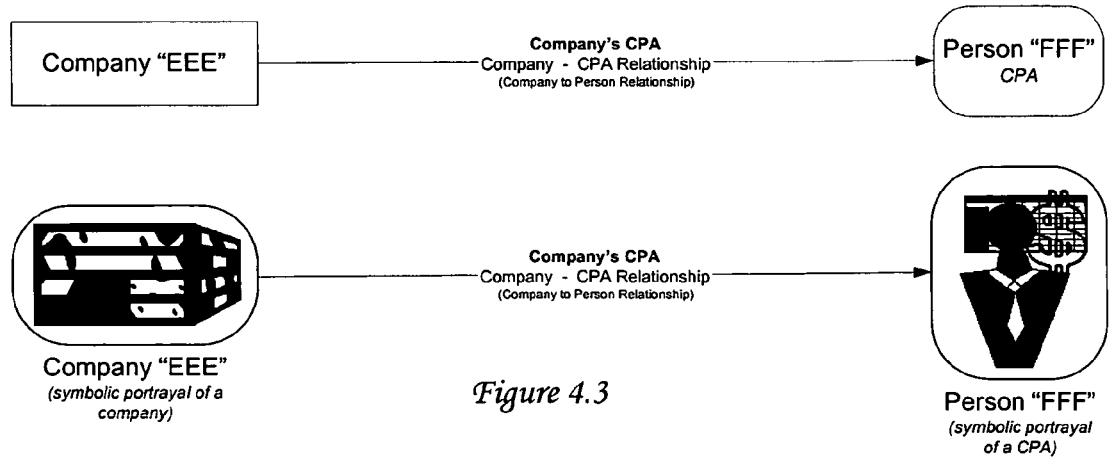
Figure 4.3

Person to Company Relationships
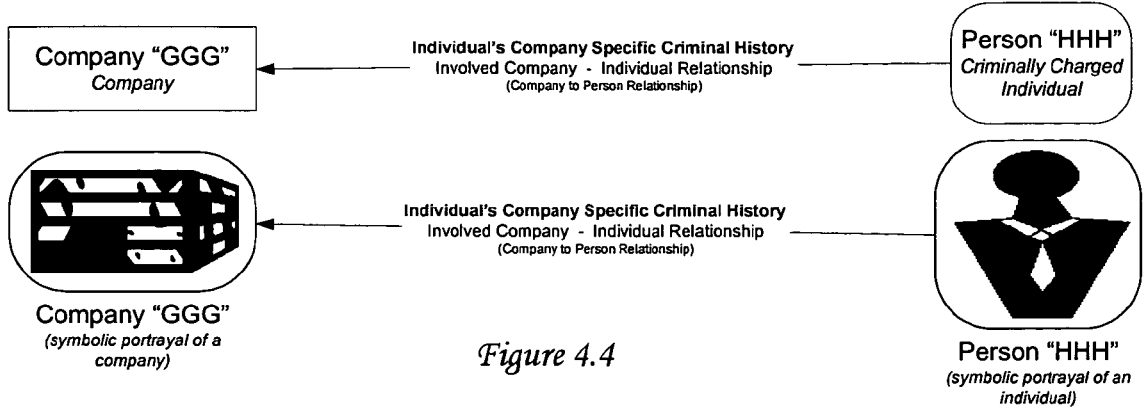
Figure 4.4
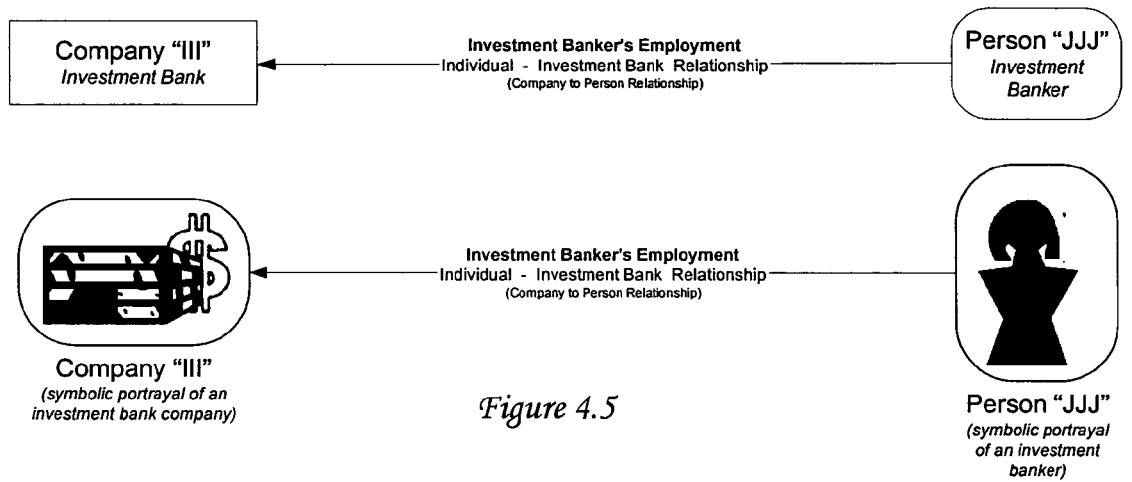
Figure 4.5
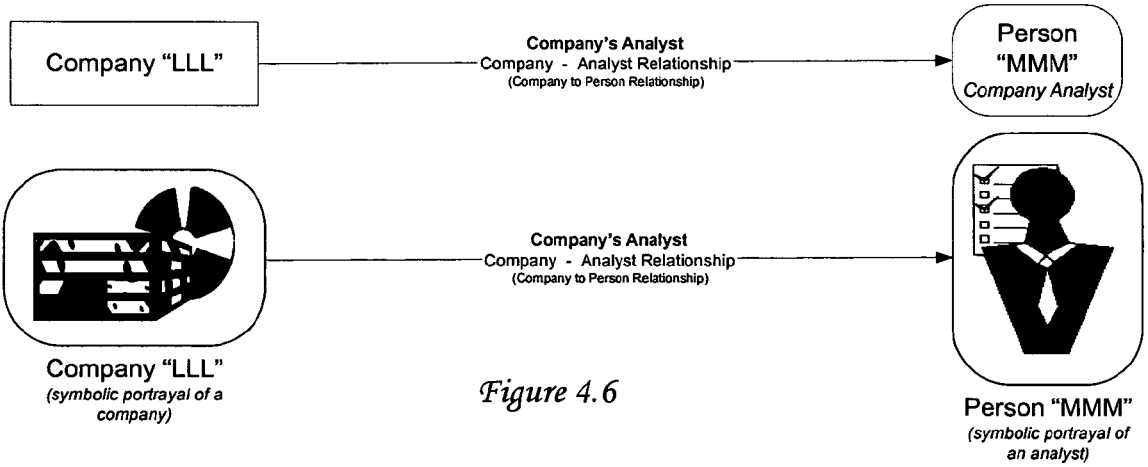
Figure 4.6

Person to Company Relationships
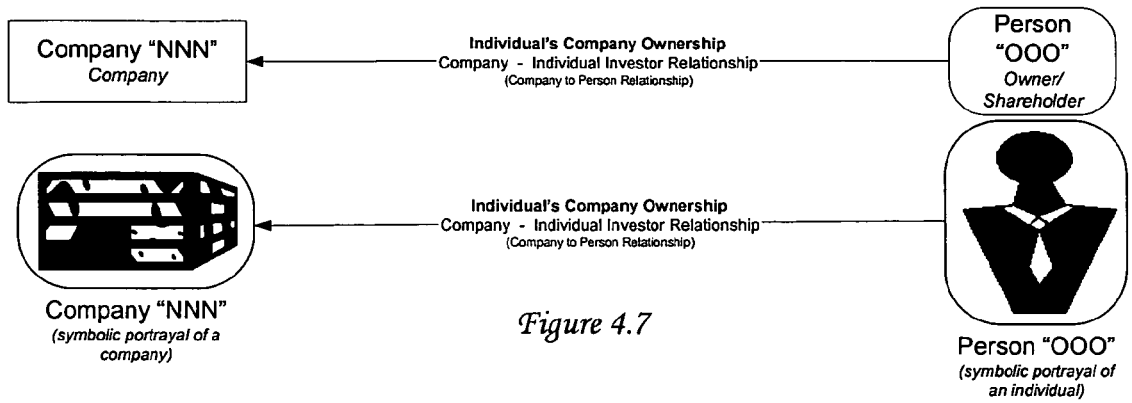
Figure 4.7
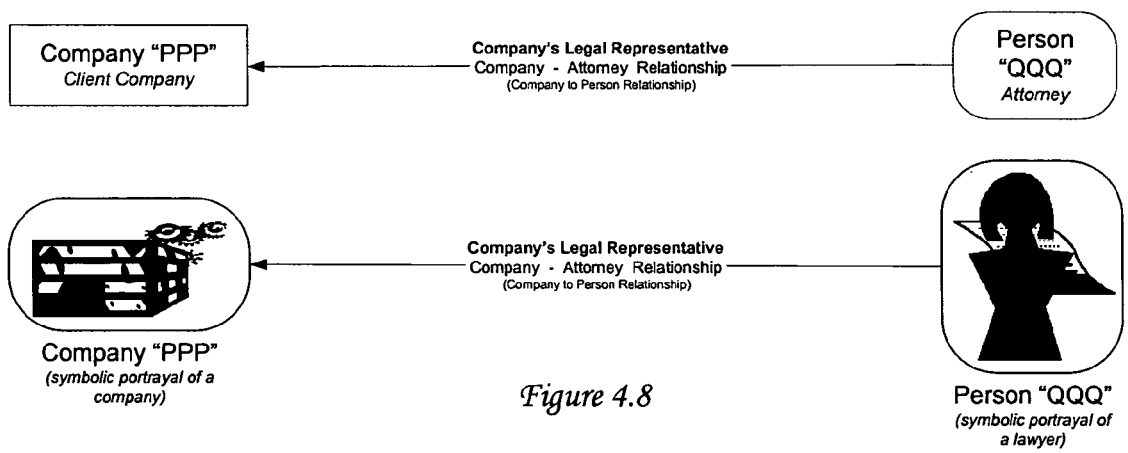
Figure 4.8
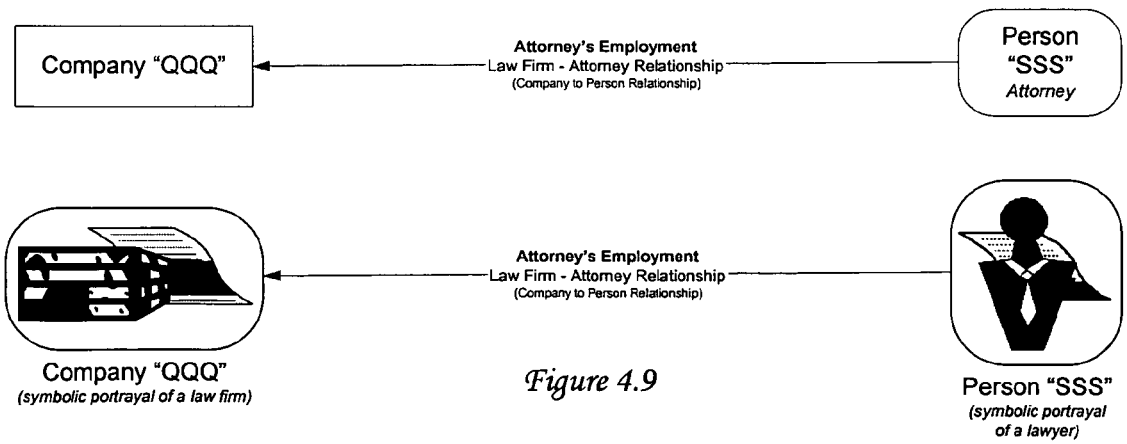
Figure 4.9

Person to Company Relationships
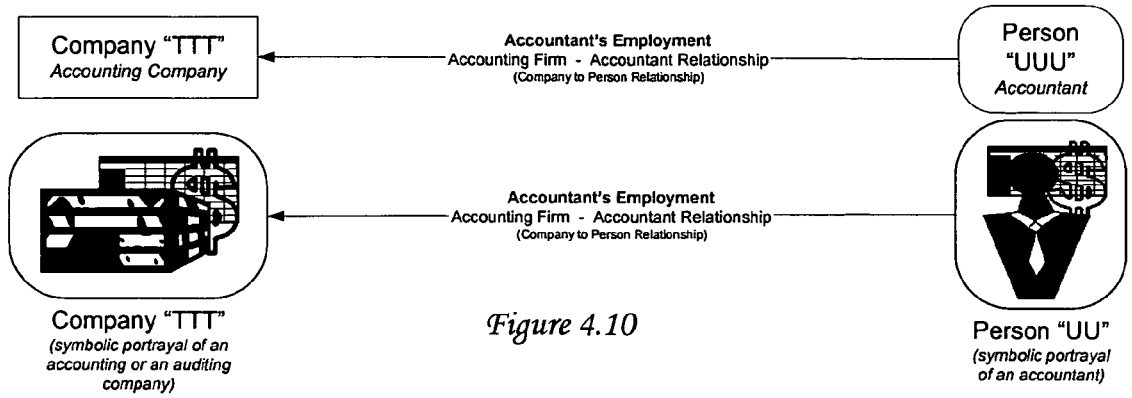
Figure 4.10
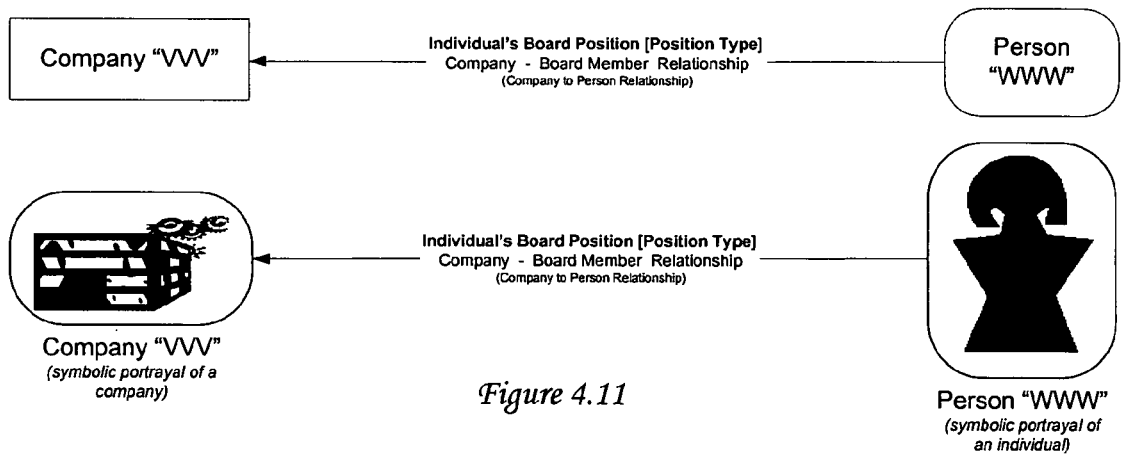
Figure 4.11
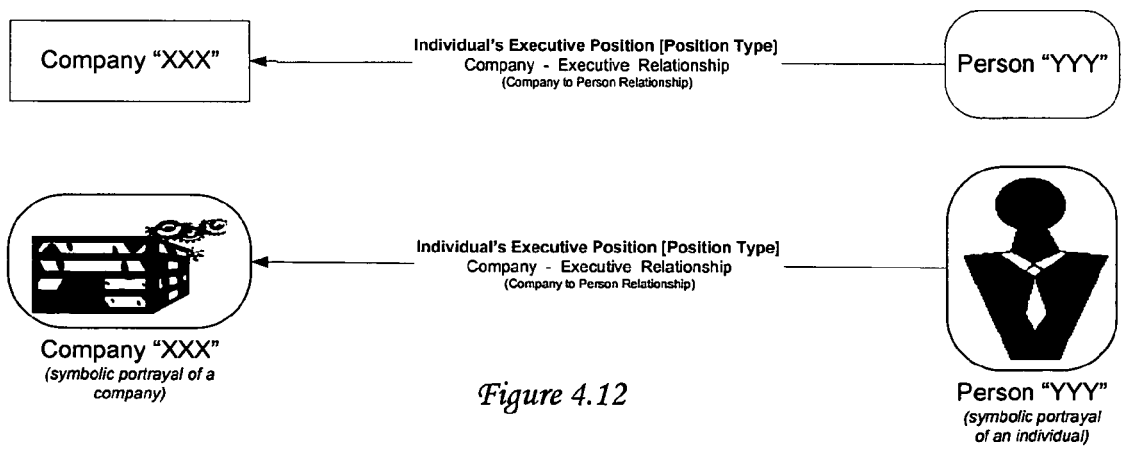
Figure 4.12

Person to Company Relationships
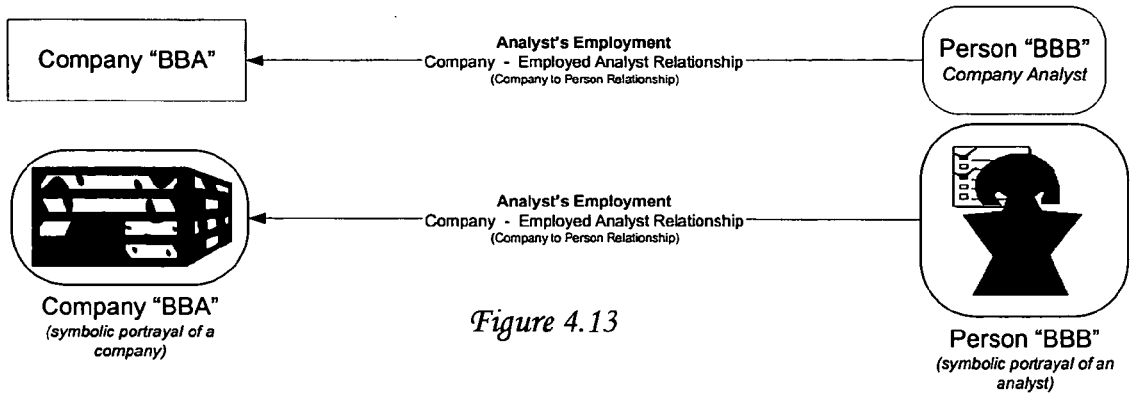
Figure 4.13
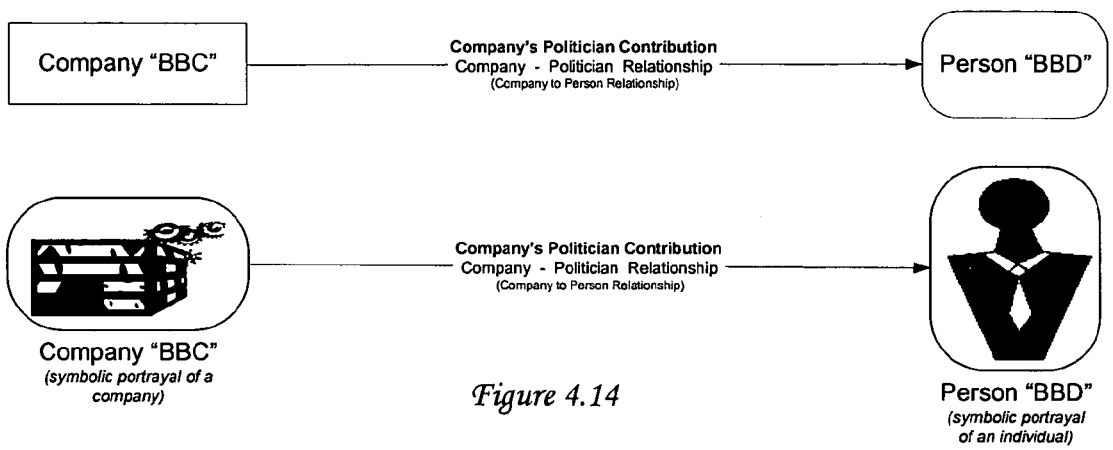
Figure 4.14
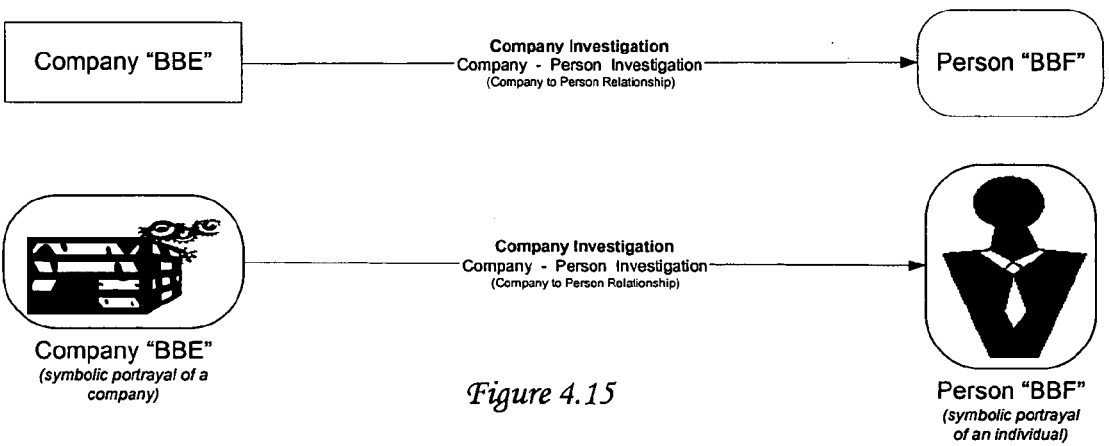
Figure 4.15

Person to Company Relationships
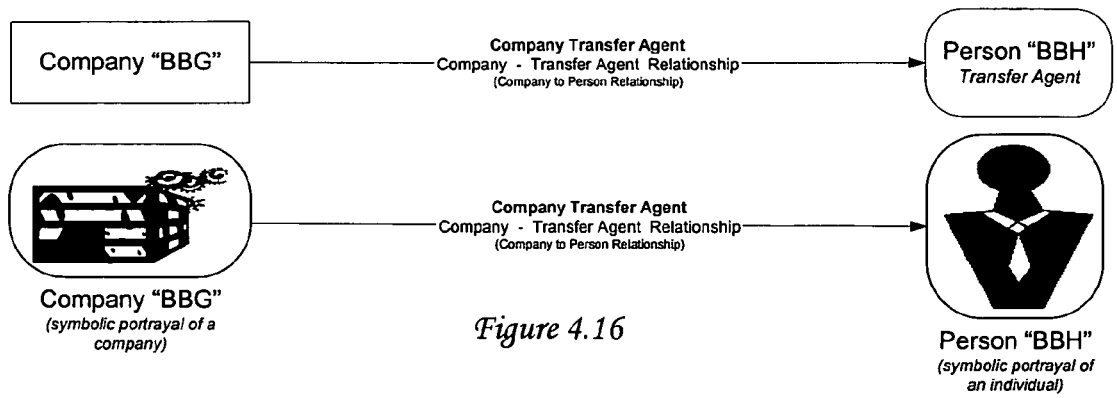
Figure 4.16
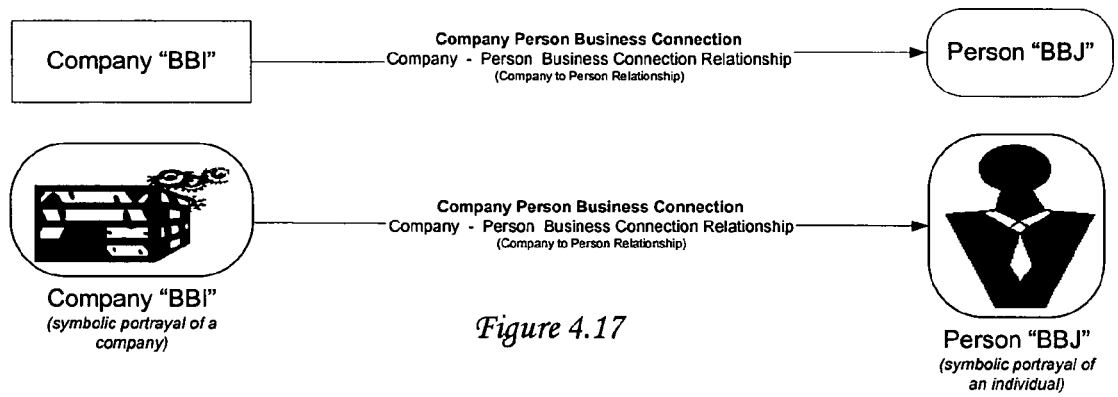
Figure 4.17

Miscellaneous Relationships
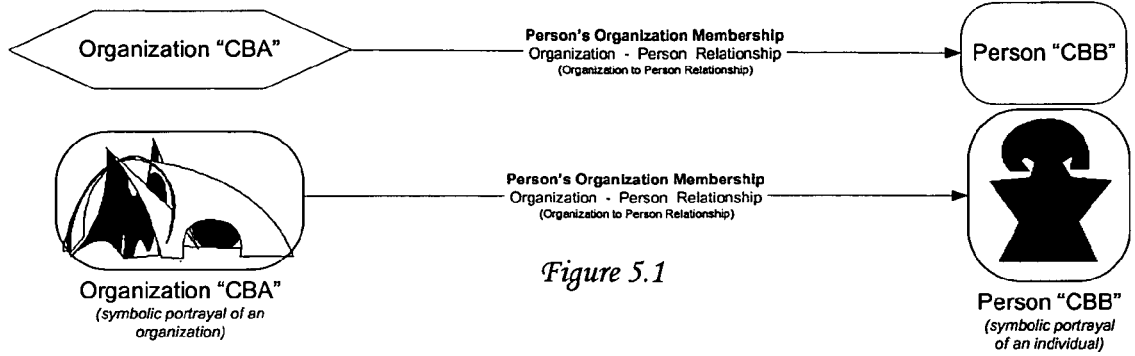
Figure 5.1
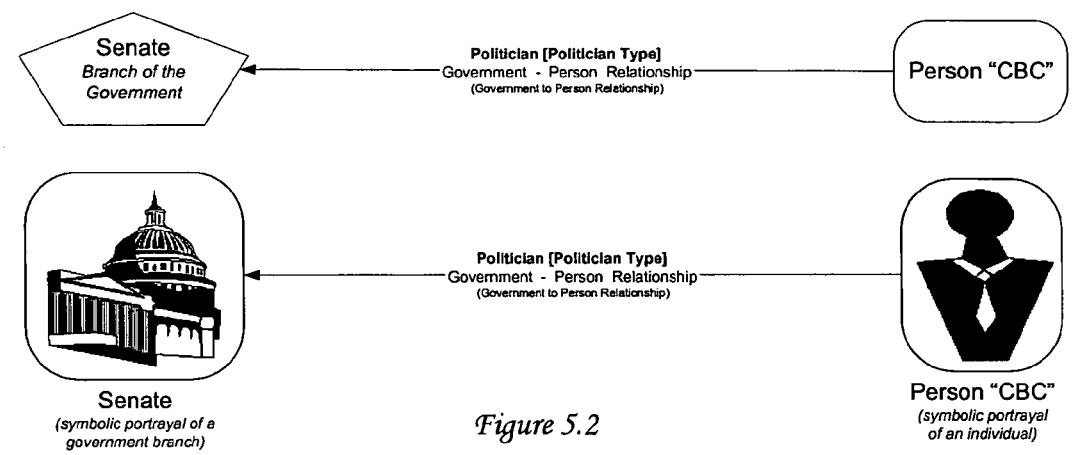
Figure 5.2
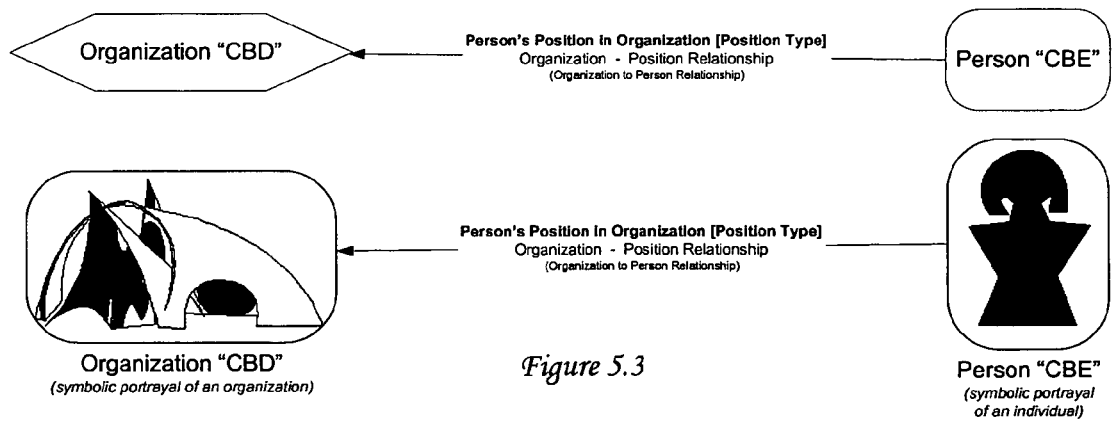
Figure 5.3

Miscellaneous Relationships
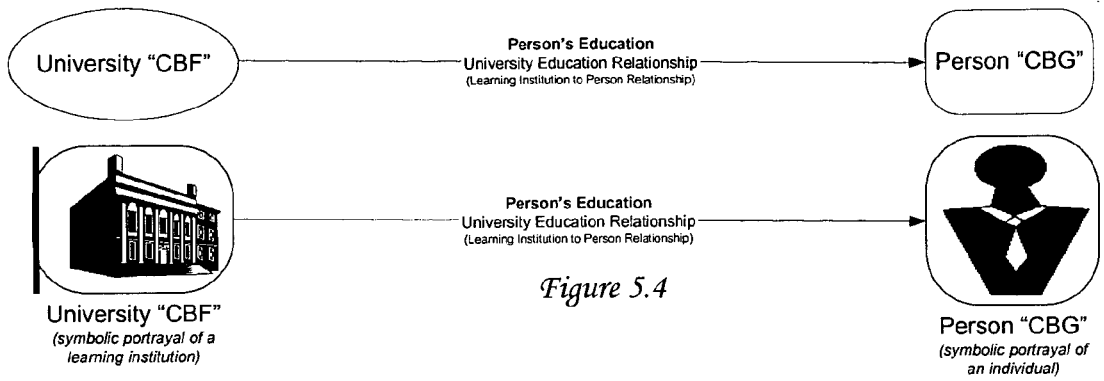
Figure 5.4
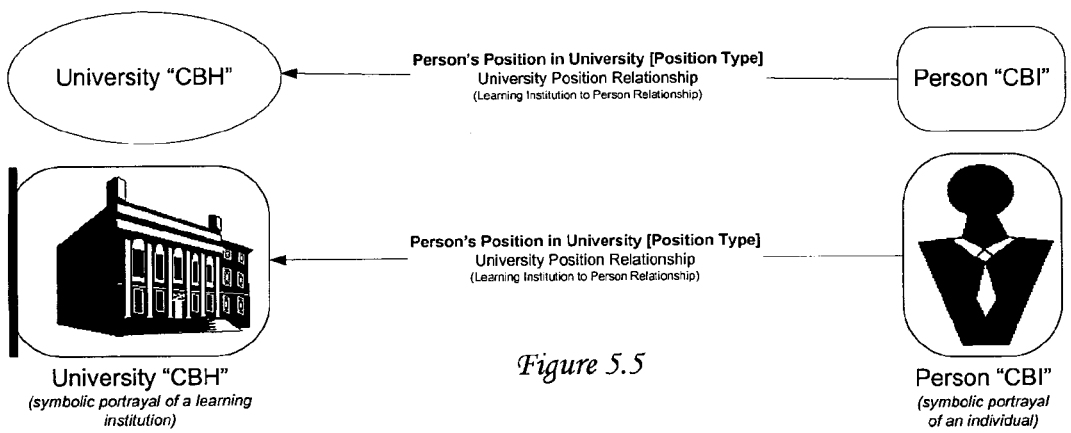
Figure 5.5
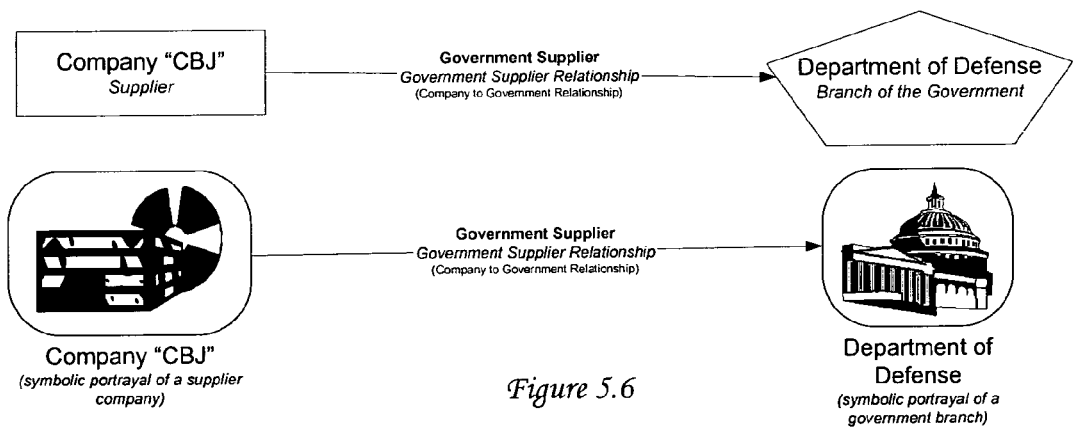
Figure 5.6

Miscellaneous Relationships
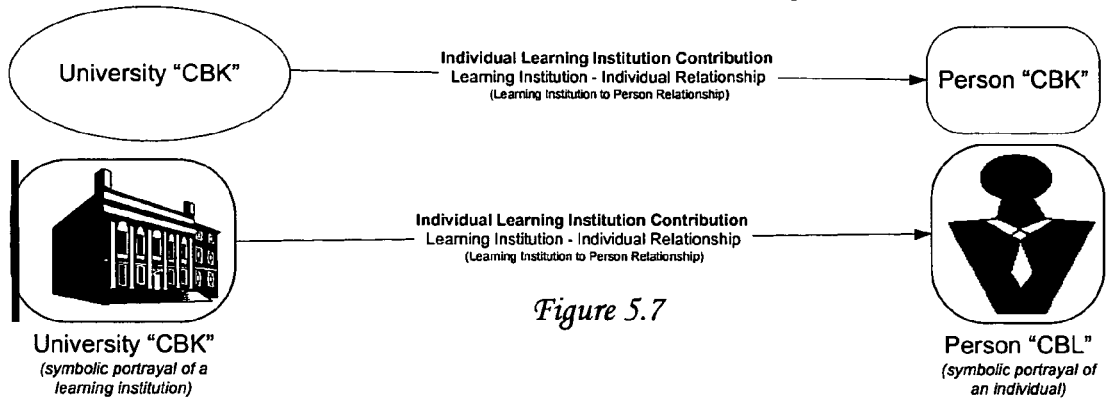
Figure 5.7
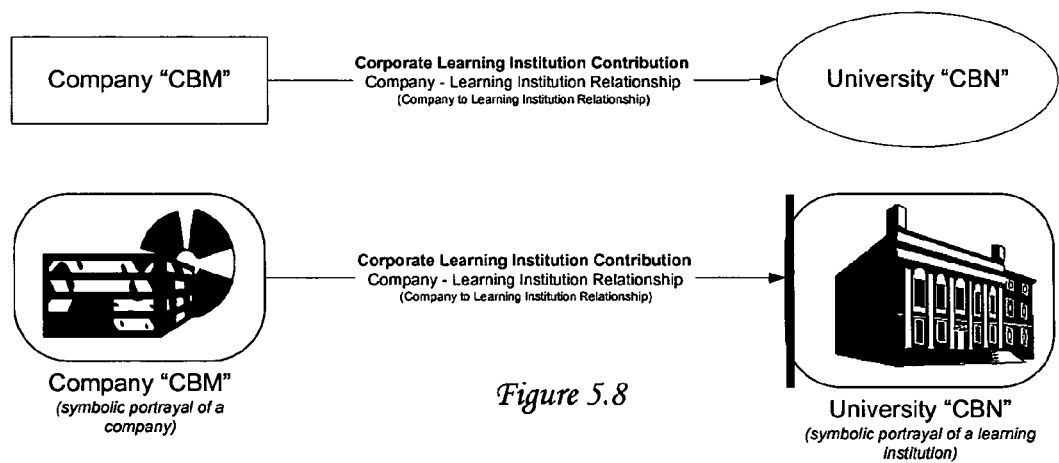
Figure 5.8
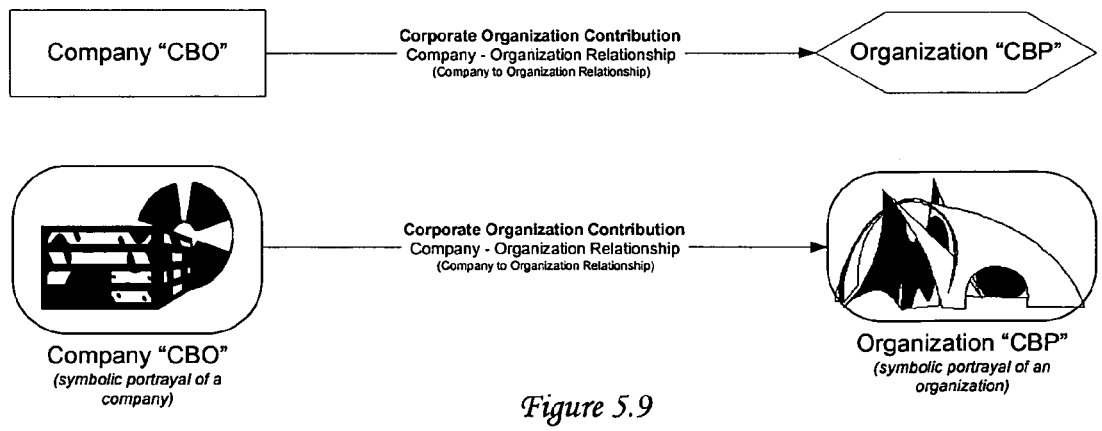
Figure 5.9

Miscellaneous Relationships
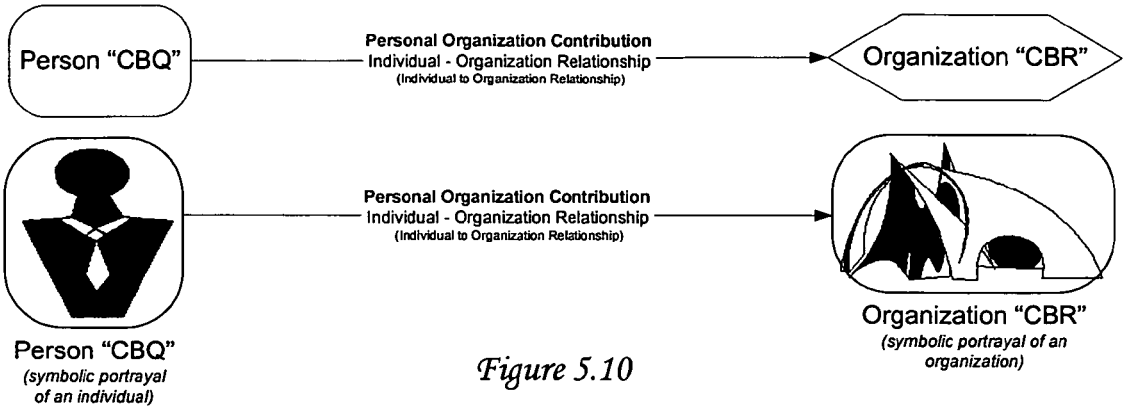
Figure 5.10
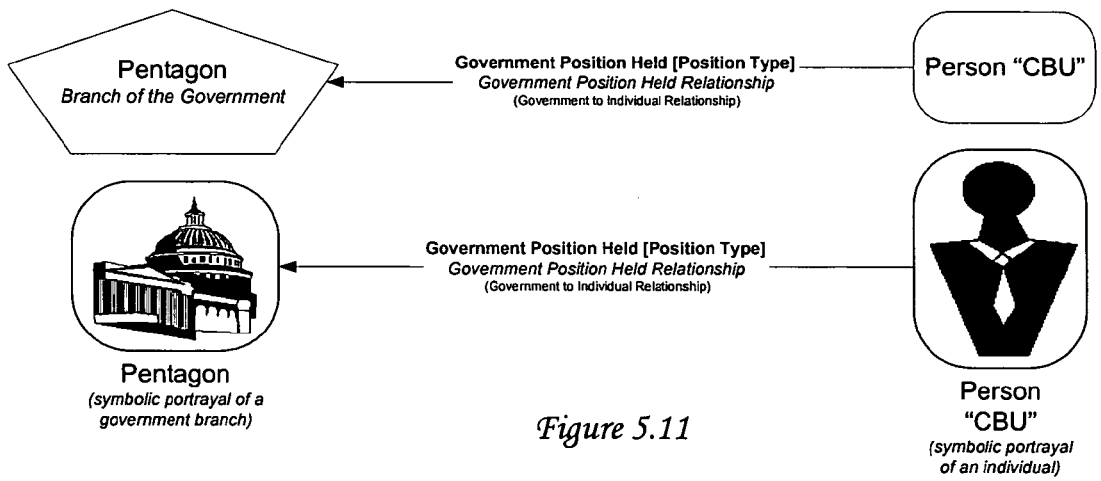
Figure 5.11
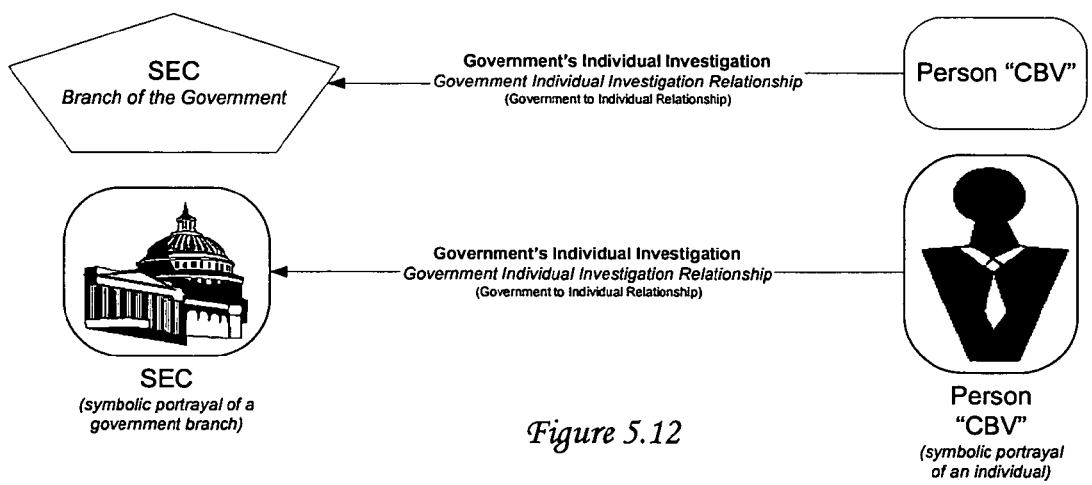
Figure 5.12

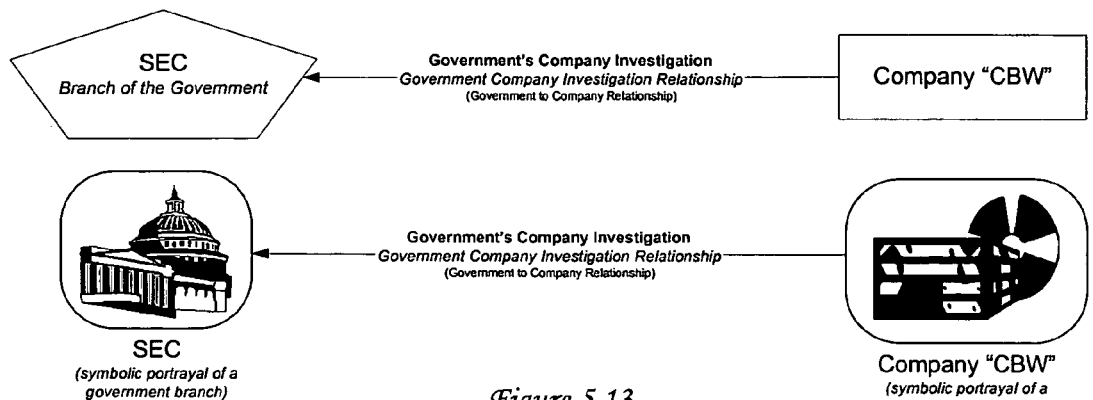
Figure 5.13
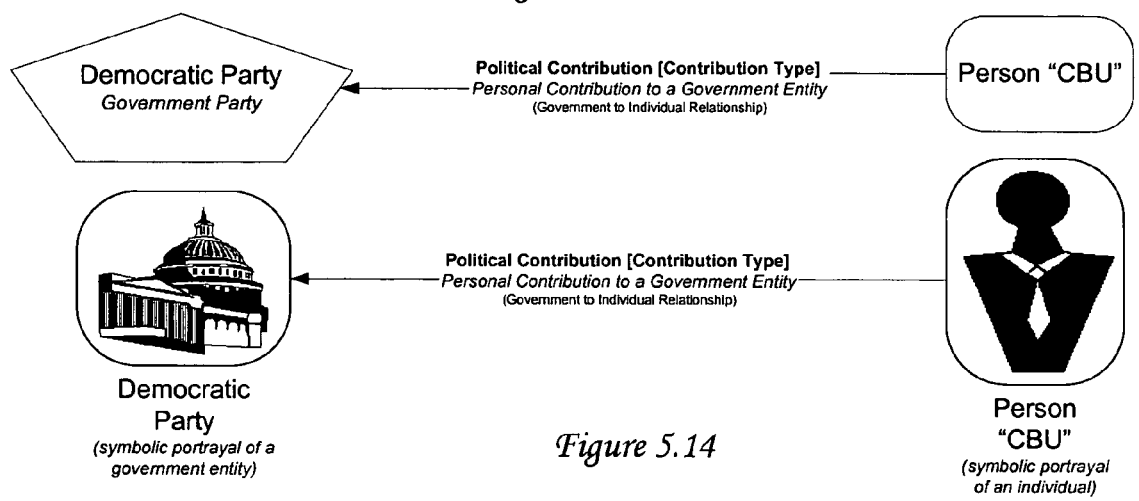
Figure 5.14

METHOD OF GRAPHICAL PRESENTATION OF RELATIONSHIPS BETWEEN INDIVIDUALS, BUSINESS ENTITIES, AND ORGANIZATIONS

FIELD OF INVENTION

I invented a more effective method of presenting information from one or many computer databases about companies' and individuals' involvement in the business marketplace through a graphical presentation of various relationships with business significance between individuals, companies, corporate entities, and other organizations. Examples of such involvement include past or present executive positions, board positions, company suppliers, company customers, and others.

BACKGROUND

Every money manager's most valuable asset is information. A critical piece of information has a potential to make or break a deal involving large sums of money. The information that is highly valuable for financial institutions is not raw facts involving a company or an individual of their interest, but rather is an agglomeration of these facts into a relevant representation of a complete picture. Although it is true that an advent of digital medium has made a wealth of information available online, this information is scattered across the web and is usually not presented in a manner that is most helpful for the decision makers in financial institutions.

The current way that computer database content providers are supplying a viewer with details regarding a company's or a person's involvement in the corporate sector is done through text, and is usually included within the provided biography of an individual or the provided history of a company. Investors who wish to gain better understanding about interrelationships among specific corporations, organizations and individuals face multiple inconveniences when utilizing such textual content because:

(a) The viewer must spend a great amount of time reading unorganized textual data about a person or a company to understand the subject's involvement in the marketplace.

(b) The viewer must subscribe to multiple sources of news and content providers and extract information that is relevant to the involvement of the subject in the marketplace.

(c) The viewer does not gain an immediate sense of the characteristics of the researched subject. Examples of characteristics may include gender of a person, industry of a company, profession of an individual, size of a company, net worth of an individual, and others.

(d) The viewer cannot gain a complete representation of the subject's involvement in the corporate sector because textual descriptions fail to effectively provide all implicit involvements of a subject. For example, a person may be implicitly involved in a company because of his or her spouse's explicit involvement in it.

Although it has been known for a very long time that genealogic relationships between people might be represented with graphical relationships between textual names in a two-dimensional presentation, no similar presentation has been used for relationships of business significance between business related entities.

SUMMARY OF THE INVENTION

My method of graphically presenting various relationships with business significance between individuals, companies, financial or business entities, and organizations is superior because the presentation is graphical rather than textual, thus easier for a reader to comprehend the content, therefore using the viewer's time more efficiently. Further, all relationships are displayed together. This approach eliminates the need to research multiple sources as well as the need for industry-specific knowledge to decipher convoluted business intelligence text that is often narrowly tailored toward professionals in the field. Also, the presented individuals, companies, entities and other organizations may be symbolized by representative icons to give a viewer a much faster grasp of the content. Some entities may not only be represented via a symbol of an individual, or a company, but will actually have the person's portrait as the graphical portrayal of the person and logo of the company as the graphical representation of the company on the screen. This method also highlights "illogical" and "questionable" relationships in the context of the given and presented data, thus giving the user not only raw data, but clues on possible points of interest.

An example of output from the system may graphically describe a relationship with business significance between queried companies that may not be evident through manual analysis. For example, a customer is wondering if Company-A and Company-B have any indirect relationships with business significance or 'ties' that is not evident in an initial examination of both companies. The one output may graphically present the following scenario: Company-B's CEO has a son who is a COO of Company-Y. Company-Y has 70% ownership of Company-Q. Company-Q is a main supplier to the Company-A. Although information in this particular example is somewhat simple, it is nonetheless very hard to visualize without prior knowledge of any of these relationships. On the contrary, this nature of information may provide clues to financial managers about significance of such 'ties' in the context of the companies of their current or potential vested interests.

This system will offer customers a visual perspective of the current business landscape. The product will graphically provide a complete picture about a subject of inquiry's importance, significance and relationships with the business world. The system will visually present the information in a manner that is most suitable to a user's query, whether it is a search regarding a specific individual, corporation, or a search that involves finding relationships with business significance between multiple, intuitively unrelated subjects. More specifically, if the user's search consists of one company or individual of interest, the system will graphically represent the subject's ties with key industry players. During rendering, the queried subject will appear in the middle of the screen, and its relationships to the business world will radiate from it. On the other hand, if an individual chooses to query any permutation of individuals or companies at once, the system will render them on the screen, and complete the direct or indirect relationships that they may have to one another. At all times the system will be on the lookout for relationships with business significance that logically "do not fit" the picture (for example, competing companies that are partially owned by husband and wife, respectively).

In one aspect, the invention is a computer method for presenting a graphical display of relationships with business significance between a plurality of business related entities.

Each entity might be an individual person, an identifiable group of people, a partnership, an association, a corporation, governmental body, a non-profit organization, a religious group, a membership club, an industry, an educational institution, a geographical area in which people reside, or a group endeavor. The method comprises displaying at least three graphical objects, each object representing a business related entity, and displaying at least two graphical links, each link connecting one of the graphical objects with another graphical object. Each of the at least three graphical objects is connected to each of the other graphical objects, either directly or indirectly via one or more of the other graphical objects. Each of the links that connect graphical objects represents a relationship with business significance between the objects that it connects. Each graphical object can be represented with an arbitrary shape, such as a circle or triangle or rectangle, or it can include a symbolic representation of the represented business related entity, such as an image showing a person and gender of the person or a portrait of the actual person or a logo for any of the various kinds of business related entities.

The relationship with business significance that is represented by a link in the graphical display can be any of: ownership, acquisition, merger, joint venture, directorship, officership, employment, contractors, service provider, licensor, supplier, adversary in a legal proceeding, adversary in a regulatory proceeding, competitors, participant, member, relative, sibling, spouses, parent-child, friends, benefactor, political supporter, political position, sponsorship, subsidiary, trade group membership, military service, or geographical proximity.

One or more of the three graphical objects may include associated text with information about the business related entity. Similarly, one or more of the links connecting the graphical objects can have associated text containing information about the relationship of business significance represented by the link.

In another aspect, the invention is a computer method for presenting a response to a query about a business related entity. In response to a query, the system retrieves information from one or more databases, typically by obtaining information across a network. The information is then presented as described above with the business related entity that was identified in the query presented in a prominent position in the graphical display, such as the center of the display.

BRIEF DESCRIPTION OF THE FIGURES

The features of the present invention which are believed to be novel are set forth with particularity in the appended claims. Aspects of the invention, together with further objects and advantages thereof, may best be understood by making reference to the following description taken in conjunction with the accompanying drawings wherein:

FIG. 1.0 is a sectional view of a sample graphical presentation.

FIG. 1.1 is an example of how my method of presentation may be used without symbols.

FIG. 1.2 is another variation of my method of presentation using symbols.

FIGS. 2.3-2.12 are a subset of depictions of company-to-company relationships that my method of presentation will use.

FIGS. 3.1-3.7 are a subset of depictions of person-to-person relationships with business significance that my method of presentation will use.

FIGS. 4.1-4.17 are a subset of depictions of person-to-company relationships that my method of presentation will use.

FIGS. 5.1-5.14 are a subset of depictions of other relationships with business significance that my method of presentation will use.

DETAILED DESCRIPTION

In the following detailed description of exemplary embodiments of the invention, reference is made to the accompanying drawings. The detailed description and the drawings illustrate specific exemplary embodiments by which the invention may be practiced. Other embodiments may be utilized, and other changes may be made, without departing from the spirit or scope of the present invention. The following detailed description is therefore not to be taken in a limiting sense, and the scope of the present invention is defined by the stated claims.

The FIGS. 2.3-2.12, 3.1-3.7, 4.1-4.17 and 5.1-5.13 exemplify the plurality of relationships that my method uses to graphically portray the interdependencies between individuals, companies, financial or business entities, and organizations. Each figure consists of two variations. The top part displays the relationship without symbolic representation, while the bottom part of the figure uses symbols. These figures are discussed in detail below. Components of each display are shown in FIG. 1.0:

1—Rendering Area
4—Graphical objects
6—Graphical links or other connections for relationships
3—Symbolic representations of each entity
2—Textual character set embedded in each graphical object
5—Textual character set embedded in each graphical link FIG. 1.0 illustrates a layered view of the user interface for displaying the relationships with business significance between various business related entities. The graphical interface is comprised of a rendering area 1 that displays a set of graphical objects 4 and graphical object connectors 6. Each graphical object 4 represents one business related entity, such as an individual, financial entity, company, or other organization. It may have an included character set 2 that describes the entity by its type and specific identification (individual name, company name, etc.) The graphical objects 4 may be of different shapes to signify further characteristics of the entity presented.

The graphical object 4 may house a symbolic or pictoric representation 3 of the entity. If the pictoric representation 3 is present, it can be a symbol that represents or characterizes the type of entity the graphical object 4 is representing, or it can be a portrait of a person if a person is being represented, or a logo of a company if a company is being represented. The graphical object may house a combination of text, symbol, logo, or a portrait of the entity being described.

Graphical objects 4 may be connected via a graphical link 6 that signifies a relationship with business significance between two entities. The graphical link may be a line or any other visual portrayal of a connection between two graphical objects in the rendering area. The graphical link may have arrows to symbolize the direction of dependence between two objects. The graphical link 6 may be accompanied with a character set 5 in its vicinity that describes the relationship.

The method of visual representation in FIG. 1.0 may also use colors to portray characteristics of the relationships or business related entities presented.

Possible manipulation of the objects and the rendering area presented includes:

Zooming—Users may have an ability to zoom the view to accommodate the computer screen for all the graphical objects Relocation—Users may have an ability to relocate the objects via a mouse click or keyboard inputs to reorganize the visual display for their own purposes.

Printing—Users may have an ability to print the screen and copy the graphical representation to a computer readable medium.

Color coordination—User may have an ability to customize color coordination of the viewable display for aesthetic and clarity purposes.

The following are descriptions of representative company-to-company relationships that my invention will display:

Company's Investment Bank (FIG. 2.3) illustrates a past or present investment bank of a company. Both the company and an investment bank are represented by an object or a symbol on a screen and connected by a graphical link with text describing the type of relationship and more information specific to the relationship.

Competitors (FIG. 2.4) illustrates a past or present competitor of a company. Both of the identified companies are represented by an object or a symbol on the screen and connected by a graphical link with text describing the type of relationship and more information specific to the competition.

Company-to-Company Ownership (FIG. 2.5) illustrates a past or present ownership (full or partial) of one company by another company. Both companies are represented by an object or a symbol on a screen and connected by a graphical link with text describing the type of relationship and more information specific to the ownership. An example of more relation-specific information includes the number and class of shares owned, percentage of ownership, date acquired, etc. . . .

Company's Accounting Firm (FIG. 2.6) illustrates a past or present accounting firm that services the company. Both an accounting firm and a company are represented by an object or a symbol on a screen and are connected by a graphical link with text describing the type of relationship and more information specific to the relationship.

Supplier (FIG. 2.7) illustrates a past or present supplier of a company. Both companies are represented by an object or a symbol on a screen and connected by a graphical link with text describing the type of relationship and more information specific to the relationship.

Company's Law Firm (FIG. 2.8) illustrates a past or present law firm that services the company. Both a law firm and a company are represented by an object or a symbol on the screen and are connected by a graphical link with text describing the type of relationship and more information specific to the relationship.

Company-Company Investigation (FIG. 2.9) illustrates a past or present investigation that one company has pursued against another company. Both of the companies are represented by an object or a symbol on a screen and are connected by a graphical link with text describing the type of relationship and more information specific to the investigation.

Company-Company Agreement (FIG. 2.10) illustrates a past or present publicly disclosed agreement between two companies. Both of the companies are represented by an object or a symbol on a screen and are connected by a graphical link with text describing the type of relationship and more information specific to the agreement.

Company-to-Company Lawsuit (FIG. 2.11) illustrates a past or present lawsuit between two companies. Both of the companies are represented by an object or a symbol on a screen and are connected by a graphical link with text describing the type of relationship and more information specific to the lawsuit.

Company-to-Company Merger (FIG. 2.12) illustrates a past or present merger between two companies. Both of the companies are represented by an object or a symbol on a screen and are connected by a graphical link with text describing the type of relationship and more information specific to the merger.

The following are descriptions of representative person-to-person relationships that my invention will display:

Individual's Lawyer (FIG. 3.1) illustrates a past or present lawyer of a person. Both a lawyer and a person are portrayed by an object, a symbol, or a portrait and are connected by a graphical link with text describing the type of relationship and more information specific to the relationship.

Individual's Manager (FIG. 3.2) illustrates a past or present superior of a person. Both a superior and an individual are portrayed by an object, a symbol, or a portrait and are connected by a graphical link with text describing the type of relationship and more information specific to the relationship.

Husband-Wife (FIG. 3.3) illustrates a past or present marital relationship of a person. Both a husband and a wife are portrayed by an object, a symbol, or a portrait and are connected by a graphical link with text describing the type of relationship and more information specific to the marriage.

Parent-Child (FIG. 3.4) illustrates a child of a person. Both a parent and a child are portrayed by an object, a symbol, or a portrait and are connected by a graphical link with text describing the type of relationship and more information specific to the family relationship.

Individual's Adversary (FIG. 3.5) illustrates a past or present enemy of a person. Both individuals are portrayed by an object, a symbol, or a portrait and are connected by a graphical link with text describing the type of relationship and more information specific to the conflict or the circumstances.

Individual's Friend (FIG. 3.6) illustrates a past or present friend of a person. Both individuals are portrayed by an object, a symbol, or a portrait and are connected by a graphical link with text describing the type of relationship and more information specific to the friendship.

Person to Person Business Relationships (FIG. 3.7) illustrates a past or present business relationship of two people. A business connection is a portrayal of a circumstance where two individuals' business careers have intersected. Both individuals are portrayed by an object, a symbol, or a portrait and are connected by a graphical link with text describing the type of relationship and more information specific to the connection.

The following are descriptions of representative person-to-company relationships that my invention will display:

Individual's Adversary Company (FIG. 4.1) illustrates a past or present enemy company of a person. Both a person and a company are portrayed by an object, a symbol, or a portrait and are connected by a graphical link with text describing the type of relationship and more information specific to the conflict or the circumstances.

Company's Investment Banker (FIG. 4.2) illustrates a past or present investment banker of a company. Both an investment banker and a company are portrayed by an object, a symbol, or a portrait and are connected by a graphical link with text describing the type of relationship and more information specific to the relationship.

Company's CPA (FIG. 4.3) illustrates a past or present certified public accountant that services a company. Both a CPA and a company are portrayed by an object, a symbol, or a portrait and are connected by a graphical link with text describing the type of relationship and more information specific to the relationship.

Individual's Company-specific Criminal History (FIG. 4.4) illustrates a past criminal history of a person that has involved a company. Both a person and a company are portrayed by an object, a symbol, or a portrait and are connected by a graphical link with text describing the type of relationship and more information specific to the nature of the crime.

Investment Banker's Employment (FIG. 4.5) illustrates a past or present employment of an investment banker in investment bank company. Both an investment banker and a company are portrayed by an object, a symbol, or a portrait and are connected by a graphical link with text describing the type of relationship and more information specific to the employment.

Company's Analyst (FIG. 4.6) illustrates a company's past or present relationship with an outside analyst. Both an analyst and a company are portrayed by an object, a symbol, or a portrait and are connected by a graphical link with text describing the type of relationship and more information specific to the employment.

Individual's Company Ownership (FIG. 4.7) illustrates a past or present ownership (full or partial) of a company by an individual. Both an individual and a company are portrayed by an object, a symbol, or a portrait and are connected by a graphical link with text describing the type of relationship and more information specific to the ownership.

Company's Legal Representative (FIG. 4.8) illustrates a past or present legal representation of a company by an attorney. Both an attorney and a company are portrayed by an object, a symbol, or a portrait and are connected by a graphical link with text describing the type of relationship and more information specific to the relationship.

Attorney's Employment (FIG. 4.9) illustrates a past or present employment of an attorney in a law firm. Both an attorney and a law firm are portrayed by an object, a symbol, or a portrait and are connected by a graphical link with text describing the type of relationship and more information specific to the employment or partnership.

Accountant's Employment (FIG. 4.10) illustrates a past or present employment of an accountant in an accounting firm. Both an accountant and an accounting firm are portrayed by an object, a symbol, or a portrait and are connected by a graphical link with text describing the type of relationship and more information specific to the employment or partnership.

Individual's Board Position (FIG. 4.11) illustrates a past or present board position of a person in a company. Both a person and a company are portrayed by an object, a symbol, or a portrait and are connected by a graphical link with text describing the type of relationship and more information specific to the board membership and the position type.

Individual's Executive Position (FIG. 4.12) illustrates a past or present executive position of a person in a company. Both a person and a company are portrayed by an object, a symbol, or a portrait and are connected by a graphical link with text describing the type of relationship and more information specific to the executive position and the position type.

Analyst's Employment (FIG. 4.13) illustrates a past or present employment of an analyst in a company. Both an analyst and a company are portrayed by an object, a symbol, or a portrait and are connected by a graphical link with text describing the type of relationship and more information specific to the employment.

Company's Politician Contribution (FIG. 4.14) illustrates company's past contribution of money to a politician. Both a politician and a company are portrayed by an object, a symbol, or a portrait and are connected by a graphical link with text describing the type of relationship and more information specific to the contribution and the political party.

Company's Individual-related Investigation (FIG. 4.15) illustrates a company's past or present investigation of a person. Both a person and a company are portrayed by an object, a symbol, or a portrait and are connected by a graphical link with text describing the type of relationship and more information specific to the investigation.

Company's Transfer Agent (FIG. 4.16) illustrates a past or present transfer agent of a company. Both a transfer agent and a company are portrayed by an object, a symbol, or a portrait and are connected by a graphical link with text describing the type of relationship and more information specific to the relationship.

Company Person Business Relationship (FIG. 4.17) illustrates a past or present business relationship of a company and a person. A business connection is a portrayal of a circumstance where an individual's and a company's business paths have intersected. Both an individual and a company are portrayed by an object, a symbol, or a portrait and are connected by a graphical link with text describing the type of relationship and more information specific to the connection.

The following are descriptions of representative miscellaneous relationship that my invention will display:

Individual's Organization Membership (FIG. 5.1) illustrates a past or present membership of an individual in an organization. Both an individual and an organization are portrayed by an object, a symbol, or a portrait and are connected by a graphical link with text describing the type of relationship and more information specific to the membership.

Politician (FIG. 5.2) illustrates a past or present political involvement of an individual in a government branch. Both an individual and a government branch are portrayed by an object, a symbol, or a portrait and are connected by a graphical link with text describing the type of relationship and more information specific to the political involvement.

Individual's Position in an Organization (FIG. 5.3) illustrates a past or present position that an individual held in a government branch. Both an individual and a government branch are portrayed by an object, a symbol, or a portrait and are connected by a graphical link with text describing the type of relationship and more information specific to the position held.

Individual's Education (FIG. 5.4) illustrates a past education of an individual in a learning institution. Both an individual and a learning institution are portrayed by an object, a symbol, or a portrait and are connected by a graphical link with text describing the type of relationship and more information specific to the education and the degree.

Individual's Position in a Learning Institution (FIG. 5.5) illustrates a past or present position that an individual held in a learning institution. Both an individual and a learning institution are portrayed by an object, a symbol, or a portrait and are connected by a graphical link with text describing the type of relationship and more information specific to the position held.

Government Supplier (FIG. 5.6) illustrates a company that is a past or present supplier to the government branch. Both a company and a government branch are portrayed by an object, a symbol, or a portrait and are connected by a graphical link with text describing the type of relationship and more information specific to relationship.

Individual's Learning Institution Contribution (FIG. 5.7) illustrates a personal contribution to a learning institution. Both a person and a learning institution are portrayed by an object, a symbol, or a portrait and are connected by a graphical link with text describing the type of relationship and more information specific to contribution.

Company's Learning Institution Contribution (FIG. 5.8) illustrates a corporate contribution to a learning institution. Both a company and a learning institution are portrayed by an object, a symbol, or a portrait and are connected by a graphical link with text describing the type of relationship and more information specific to contribution.

Company's Organization Contribution (FIG. 5.9) illustrates a corporate contribution to an organization. Both a company and an organization are portrayed by an object, a symbol, or a portrait and are connected by a graphical link with text describing the type of relationship and more information specific to contribution.

Individual's Organization Contribution (FIG. 5.10) illustrates a personal contribution to an organization. Both a person and an organization are portrayed by an object, a symbol, or a portrait and are connected by a graphical link with text describing the type of relationship and more information specific to contribution.

Individual's Position Held in Government (FIG. 5.11) illustrates a past or present position that an individual held in the government branch. Both an individual and a government branch are portrayed by an object, a symbol, or a portrait and are connected by a graphical link with text describing the type of relationship and more information specific to the position held.

Government's Investigation of an Individual (FIG. 5.12) illustrates a past or present government investigation of a person. Both an individual and a government branch are portrayed by an object, a symbol, or a portrait and are connected by a graphical link with text describing the type of relationship and more information specific to the investigation.

Government's Investigation of a Company (FIG. 5.13) illustrates a past or present government investigation of a company. Both a company and a government branch are portrayed by an object, a symbol, or a portrait and are connected by a graphical link with text describing the type of relationship and more information specific to the investigation.

Individual's Political Contribution (FIG. 5.14) illustrates a personal contribution to a political party or organization. Both a person and a political entity are portrayed by an object, a symbol, or a portrait and are connected by a graphical link with text describing the type of relationship and more information specific to the contribution.

There are several ways that my invention can achieve its results. In one embodiment, a viewer queries a system that utilizes my method of graphically displaying relationships between individuals, companies, financial entities, and other organizations. Next, the graphical user interface creates graphical objects and graphical relationships on the screen to signify the data to be displayed. Thirdly, the graphical user interface renders the data on the screen in a manner that is similar to the depiction of FIG. 1.1 or FIG. 1.2. The graphical interface may be extended to give the user an ability to manipulate the placement of the graphical objects on the screen, zoom in/out of the screen, and click on the objects on the screen to navigate to a source for more information.

Alternative ways that my invention can achieve results or can be implemented include:

The graphical display may have only text displayed in arrangements that resemble objects, and connectors connect these textual blocks.

The graphical display may have only portraits of the individuals and logos of the companies embedded in the rendering screen and connected by connectors that describe the relationships with business significance.

Each graphical object 4 may have multiple symbols that each describe a trait of the represented entity.

Each connector may have a graphical symbol that describes a trait of the relationship.

Symbols on the graphical object 4 may be animated, or contain moving data.

Textual data 5 can reside inside the graphical object 4 and the connector can originate from the visual proximity of the textual data.

Textual data 5 can be replaced by or used with a logo, symbol, or a graphical entity.

The connector 6 can be represented as a coloring difference that visually connects two graphical objects 4.

Graphical objects on the screen can appear to be three dimensional objects or symbols.

In one embodiment, the system's underlying technology is based on a componentized system that includes data storage, persistence, data analysis, data gathering, and user interface components. The system utilizes robust reflection capabilities of the .NET technology to fully decouple data storage and object modeling from algorithmic computations. This utilization of the reflection mechanism allows seamless connectivity to tiers, thus permitting greater expandability in all components. More importantly, a combination of polymorphism and reflection allows abstract algorithmic computations of complex relationships to be possible and not be dependent on either the data storage model or the persistence layer. The screen display rendering model utilizes XML in conjunction with VML and ASP server controls to allow fully web-based yet a robust graphical interface that is efficient, extensible, and centrally customizable.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A computer-implemented method for presenting a graphical display of relationships having business significance between a plurality of business related entities, comprising:
   automatically presenting business information about involvement of at least three different business related entity instances in a business marketplace, wherein at least one of the three different business related entity instances is a company, by:
      receiving the business information as a result of a search, the search involving at least one of the three different business related entity instances;
      for each of the three different business related entity instances, automatically displaying on a display screen a corresponding graphical object, that depicts at least some of the received business information about the corresponding business related entity instance and that depicts an associated name of the corresponding business related entity instance; and
      automatically displaying on the display screen at least two graphical links, each link connecting one of the three graphical objects with another of the three graphical objects such that each of the at least three graphical objects is connected to each of the other graphical objects, either directly or indirectly via one or more of the other graphical objects, each link showing a relationship of business significance in the business marketplace between the entity instances that correspond to each graphical object, the relationship based at least in part on the received business information.

2. The method of claim 1 wherein at least one of the graphical objects includes a symbolic representation of the corresponding business related entity instance.

3. The method of claim 2 wherein the symbolic representation is a logo for the corresponding business related entity instance.

4. The method of claim 1 wherein each graphical object has associated text containing information about the corresponding business related entity instance.

5. The method of claim 1 wherein each link has associated text containing information about the shown relationship of business significance between the business related entity instances corresponding to each graphical object.

6. The method of claim 1 wherein all of the business related entity instances that are not the business related entity instance that is the company are one or more of a partnership, an association, a corporation, a governmental body, or a non-profit organization.

7. The method of claim 1 wherein all of the business related entity instances that are not the business related entity instance that is the company are group endeavors that are a labor action or a sporting event.

8. The method of claim 1 wherein each relationship is at least one of: ownership, acquisition, merger, joint venture, directorship, officership contractors, licensor, adversary in a legal proceeding, or adversary in a regulatory proceeding.

9. A computer-implemented method for presenting a response to a query about a first business related entity instance, comprising:
   receiving a query for information about the first business related entity instance; and
   in response to the query, automatically Presenting business information about involvement of the first business related entity instance with a plurality of other business related entity instances in a business marketplace, by:
      retrieving from a database an identifier for each of the plurality of other business related entity instances, each of which has a relationship of business significance in the business marketplace with the first business related entity instance and retrieving from the database information about each relationship, wherein at least one of the plurality of business related entity instances is a company;
      for each of the first business related entity instance and the plurality of other business related entity instances, automatically displaying on a display screen a corresponding graphical object that depicts at least some of the presented business information about the corresponding business related entity instance and that depicts an associated name of the corresponding business related entity instance; and
      automatically displaying on the display screen a plurality of graphical links, each link connecting one of the graphical objects with the raphical object corresponding to the first business related entity instance such that each of the graphical objects is connected to each of the other graphical objects, either directly or indirectly via one or more of the other graphical objects, each link showing one of the relationship of business significance between the first business related entity instance and one of the plurality of other business related entity instances.

10. The method of claim 9 wherein the graphical object that corresponds to the first business related entity instance is automatically displayed on the display screen closer to a prominent part of the display screen than any of the other graphical objects.

11. The method of claim 10 wherein the prominent part is the center of the display screen.

12. The method of claim 9 wherein at least one of the graphical objects includes an icon that represents the corresponding business related entity instance.

13. The method of claim 9 wherein at least one of the graphical objects includes as part of the graphical object a portrait associated with the corresponding business related entity instance.

14. The method of claim 9 wherein each graphical object has associated text containing information about the corresponding business related entity instance.

15. The method of claim 9 wherein each link has associated text containing information about the link.

16. The method of claim 15 wherein the associated text contains information retrieved from the database.

17. The method of claim 9 wherein all of the business related sentity instances that are not the business related entity instance that is the company are one or more of a religious group, a membership club, an industry, an educational institution, or a geographical area.

18. The method of claim 9 wherein all of the business related entity instances that are not the business related entity instance that is the company are group endeavors that are a war or a political movement.

19. The method of claim 9 wherein each relationship is at least one of: competitor, participant, co-participant, member, friend, benefactor, political supporter, political position, sponsorship, subsidiary, trade group membership, military service, or geographical.

* * * * *